(12) United States Patent
Redpath (10) Patent No.: US 8,543,910 B2
(45) Date of Patent: Sep. 24, 2013

(54) DOG EAR-BASED PAGE TURNING FOR ELECTRONIC DOCUMENTS

(75) Inventor: Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/356,588

(22) Filed: Jan. 23, 2012

(65) Prior Publication Data

US 2013/0191721 A1   Jul. 25, 2013

(51) Int. Cl.
G09G 5/00 (2006.01)

(52) U.S. Cl.
USPC ........... 715/234; 715/205; 715/255; 715/702; 345/620; 345/649

(58) Field of Classification Search
USPC ............... 715/200, 201, 202, 203, 204, 205, 715/209, 234, 240, 243, 244, 246, 247, 251, 715/252, 253, 700, 731, 760, 762, 790, 791, 715/796, 226, 231, 255, 256, 702, 719, 721, 715/723, 727, 786, 787, 794, 831, 856, FOR. 200, FOR. 209; 345/620, 649, 901
See application file for complete search history.

(56) References Cited

U.S. PATENT DOCUMENTS

| | | | |
|---|---|---|---|
| 5,053,762 A | | 10/1991 | Sarra |
| 6,407,757 B1 * | | 6/2002 | Ho .................................. 715/776 |
| 7,898,541 B2 | | 3/2011 | Hong et al. |
| 8,284,167 B2 * | | 10/2012 | Li et al. ........................ 345/173 |
| 2009/0300539 A1 | | 12/2009 | Hendricks |
| 2010/0045616 A1 * | | 2/2010 | Li et al. ........................ 345/173 |
| 2010/0161653 A1 | | 6/2010 | Krasnow |
| 2011/0181513 A1 | | 7/2011 | Wu et al. |

FOREIGN PATENT DOCUMENTS

| | | |
|---|---|---|
| JP | 2000293120 | 10/2000 |
| JP | 2008033686 | 2/2008 |
| JP | 2010134938 | 6/2010 |

OTHER PUBLICATIONS

Barraza, Rick, "The Secret Behind the Page Flip Technique", http://blogs.cynergysystems.com/2009/11/13/the-secret-behind-the-page-fl . . . Nov. 13, 2009 , 6 pages.
Chen, Nicholas et al., "Navigation Techniques for Dual-Display E-Book Readers", CHI Proceedings • Finding Your Way, Florence, Italy Apr. 5-10, 2008 , 10 pages.
Coyier, Chris , "Sponsored Feature: Flipping Book", CSS-Tricks: A Web Design Community http://css-tricks.com/750-sponsored-feature-flipping-book/ May 12, 2008 , 6 pages.

(Continued)

Primary Examiner — Maikhanh Nguyen
(74) Attorney, Agent, or Firm — DeLizio Gilliam, PLLC (57) ABSTRACT

A method includes presenting a content page of a number of content pages on a display of an electronic device. The content page is placed in a content page container. A page turning container is created having length and width that is based on length and width of the content page, and the page turning container is positioned off-angle relative to a display of an electronic device. The content page container is positioned within the page turning container at approximately at a same angle as the display of the electronic device. A dog ear is placed in a dog ear container such that the initial size of the dog ear covers the top corner of the content page is within the page turning container. The method includes performing page turning operations comprising rotating the page turning container and rotating and shifting the content page container and the dog ear container.

20 Claims, 8 Drawing Sheets

(56) References Cited

OTHER PUBLICATIONS

Liesaputra, Veronica et al., "Creating and Reading Realistic Electronic Books", IEEE Computer Society—0018-9162/09 Feb. 2009, 10 pages.

Nuon, W. D., "Implementing iBooks page curling using a conical deformation algorithm", [Moof : Bar] Adventures in [Code :Magic] for Bright, Shiny Things http://wdnuon.blogspot.com/ May 5, 2010, 18 pages.

* cited by examiner

DOG EAR-BASED PAGE TURNING FOR ELECTRONIC DOCUMENTS

BACKGROUND

Embodiments of the inventive subject matter generally relate to the field of computers, and, more particularly, to dog ear-page turning of electronic documents.

Electronic readers that enable the reading and viewing of information (including books, magazines, journals, photo albums, newspapers, etc,) are becoming more popular and are beginning to replace the more traditional paper form. However, traditional electronic readers are limited in the realism of the page turning. Additionally, the page turning for some traditional electronic readers can be computationally expensive. For example, some traditional electronic readers are virtualizing page turning using three-dimensional-based processing. However, these implementations though computationally expensive are also proprietary to the format of the data. There also does not exist a means that can be applied to the Web Standards HyperText Machine Language (HTML) for content delivery World Wide Web Consortium (W3C).

SUMMARY

Some example embodiments include a method that includes presenting a content page of a number of content pages on a display of an electronic device. The presenting of the content page includes placing the content page in a content page container. The presenting of the content page includes determining a length and a width of the content page. The presenting of the content page includes determining a length and a width of a page turning container that is derived from the length and the width of the content page. The presenting of the content page includes creating the page turning container based on the length and the width derived from the length and the width of the content page. The presenting of the content page includes positioning the page turning container to an off-angle relative to a display of an electronic device. The presenting of the content page includes placing the content page container within the page turning container such that the content container is approximately at a same angle as the display of the electronic device. The presenting of the content page includes determining an initial size of a dog ear. The presenting of the content page includes determining a position of the dog ear to covering a top corner of the content page. The presenting of the content page includes creating a dog ear container. The presenting of the content page includes positioning the dog ear container on the display based on the position of the dog ear and such that the initial size of the dog ear covers the top corner of the content page is within the page turning container. The method also includes receiving an input for electronically page turning from the content page to a different content page of the number of content pages. In response to the input for electronically page turning, the method includes performing page turning operations comprising rotating the page turning container around a top point of the page turning container relative to the display and toward the dog ear container, until a final position is reached for the content page and the dog ear. The page turning operations also include clipping from being displayed on the display a portion of the content page and the dog ear that are not within the page turning container.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to HyperText Markup Language (HTML) for the dog ear-based page turning, any type of tag-based language that provides for the layering as described herein can be used. In other instances, well-known instruction instances, protocols, structures and techniques have not been shown in detail in order not to obfuscate the description.

Some example embodiments provide electronic page turning using two-dimensional processing. Such processing includes multiple tag-based containers that are layered to provide the electronic page turning. A number of content pages can be electronically turned using dog ears. For example, the content pages can include pages of an electronic book, magazine, newspaper, web pages. To provide dog ear-electronic page turning, some example embodiments include rotation and shifting of the content page and dog ear as well as rotation of a page turning container that includes the content page and dog ear. Also, such embodiments provide for electronic page turning without distortion of the content pages. As further described below, some example embodiments are applicable to both English-based and Asian-based page turning.

In contrast to some example embodiments, conventional techniques typically employ a three-dimensional rendering. This three-dimensional rendering is generally computationally very expensive (consuming a large amount of processor power) that requires intensive mathematical processing, distortion of images, etc. to produce the illusion of an electronic page turn. In particular, many of these conventional techniques use 2D and 3D computationally expensive techniques to distort the actual page data using a Bézier curve which is a parametric curve frequently used in computer graphics and related fields to distort the edge of the page for a curve of turning. In some cases the page data is packaged in proprietary formats or in some cases the computational execution relies on native to the device computer programming techniques and as a result is very difficult to use on a plurality of devices that uses standards to display data.

In contrast to conventional techniques, some example embodiments providing for demand loading of content. Some example embodiments only require a loading of two content pages, whereas content for other pages can be subsequently assigned and defined. Conventional techniques require that the content be preloaded for the different viewable pages. Accordingly, some example embodiments enable the content to dynamically change. For example, selection, marking, etc. of content by a user on a current page can determine content for subsequent pages.

Figure 1:
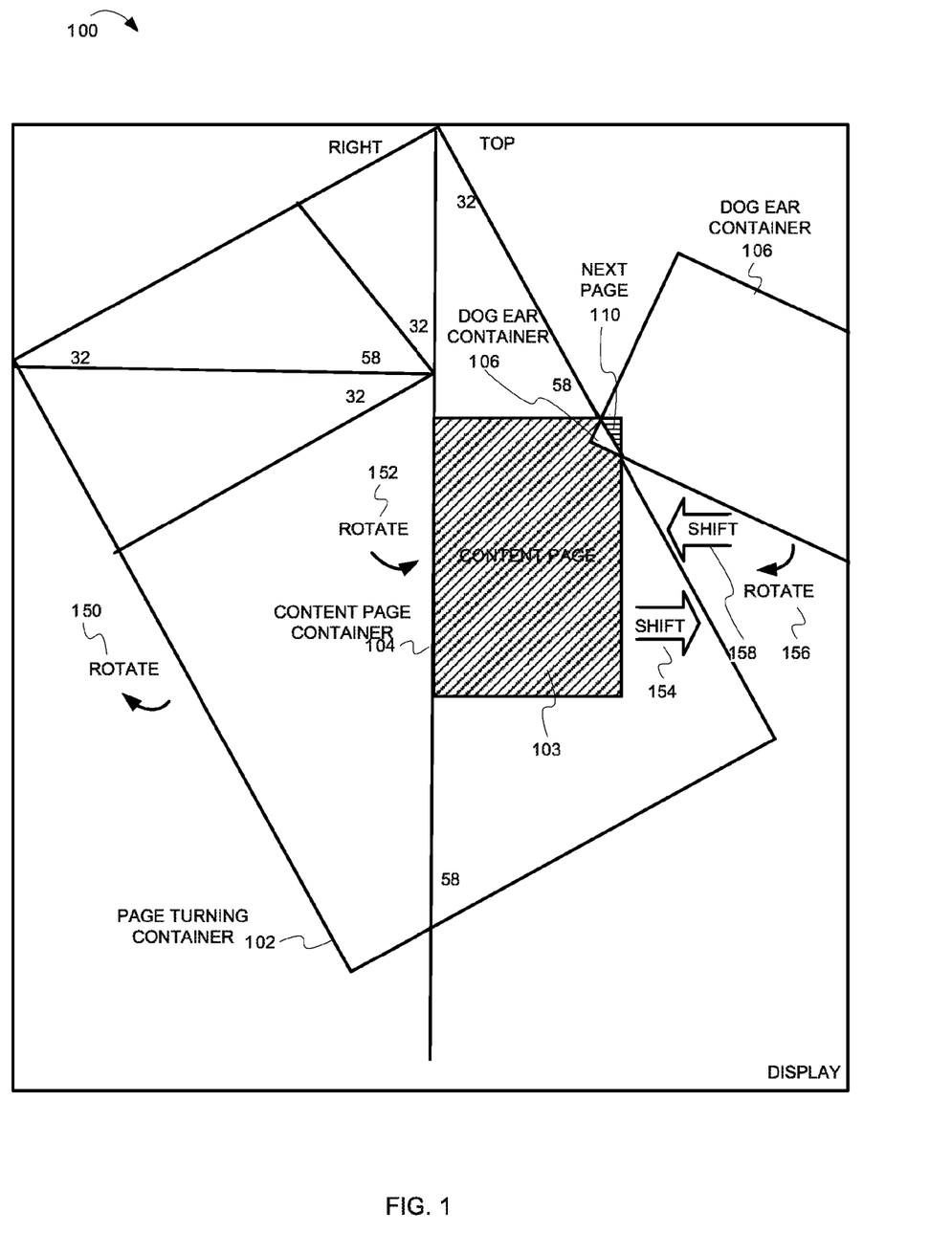
FIG. 1 depicts a display that includes dog ear-based electronic page turning at a first point in time, according to some example embodiments.
Figure 2:
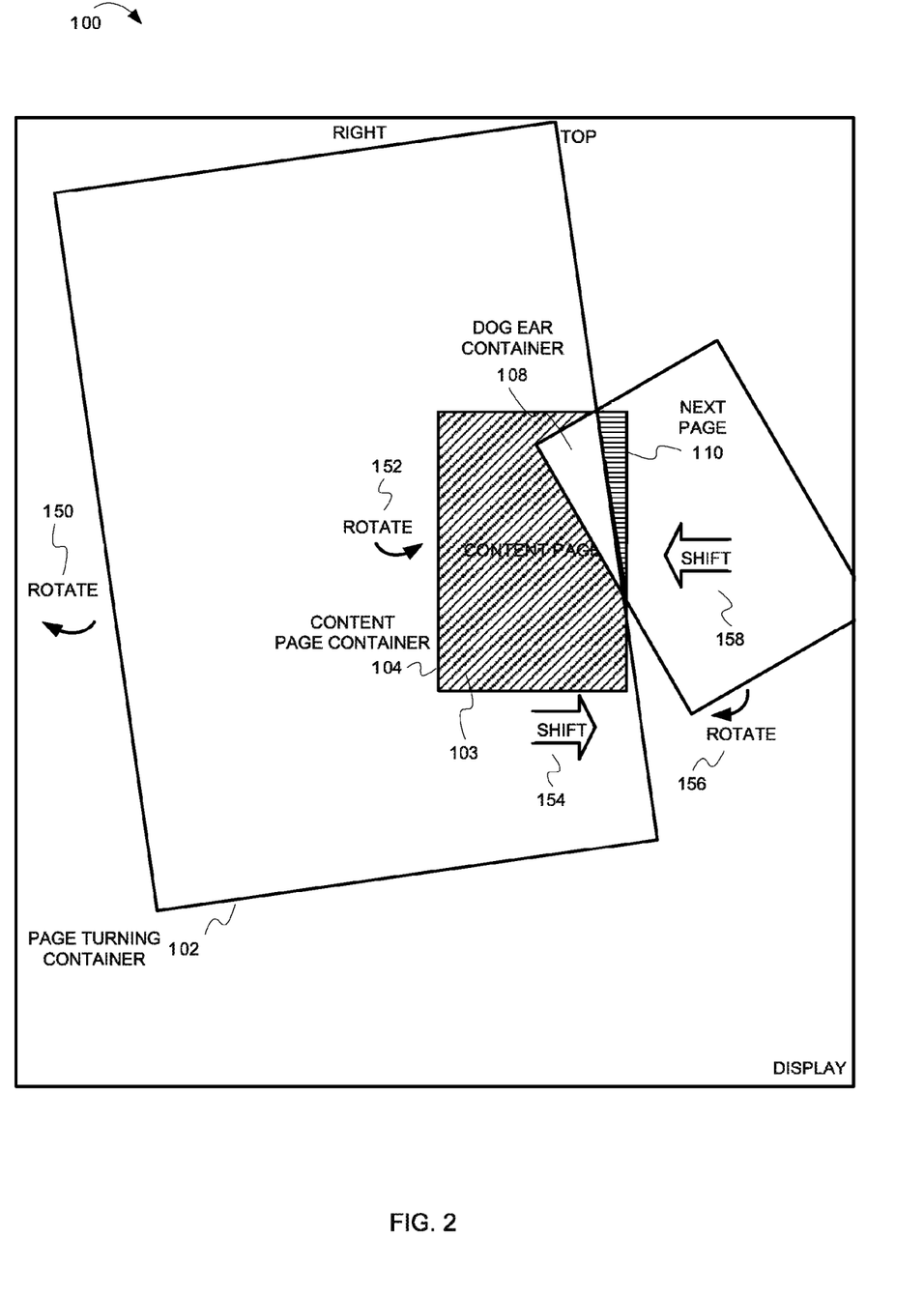
FIG. 2 depicts the display of FIG. 1 that includes dog ear-based electronic page turning at a second point in time, according to some example embodiments.
Figure 3:
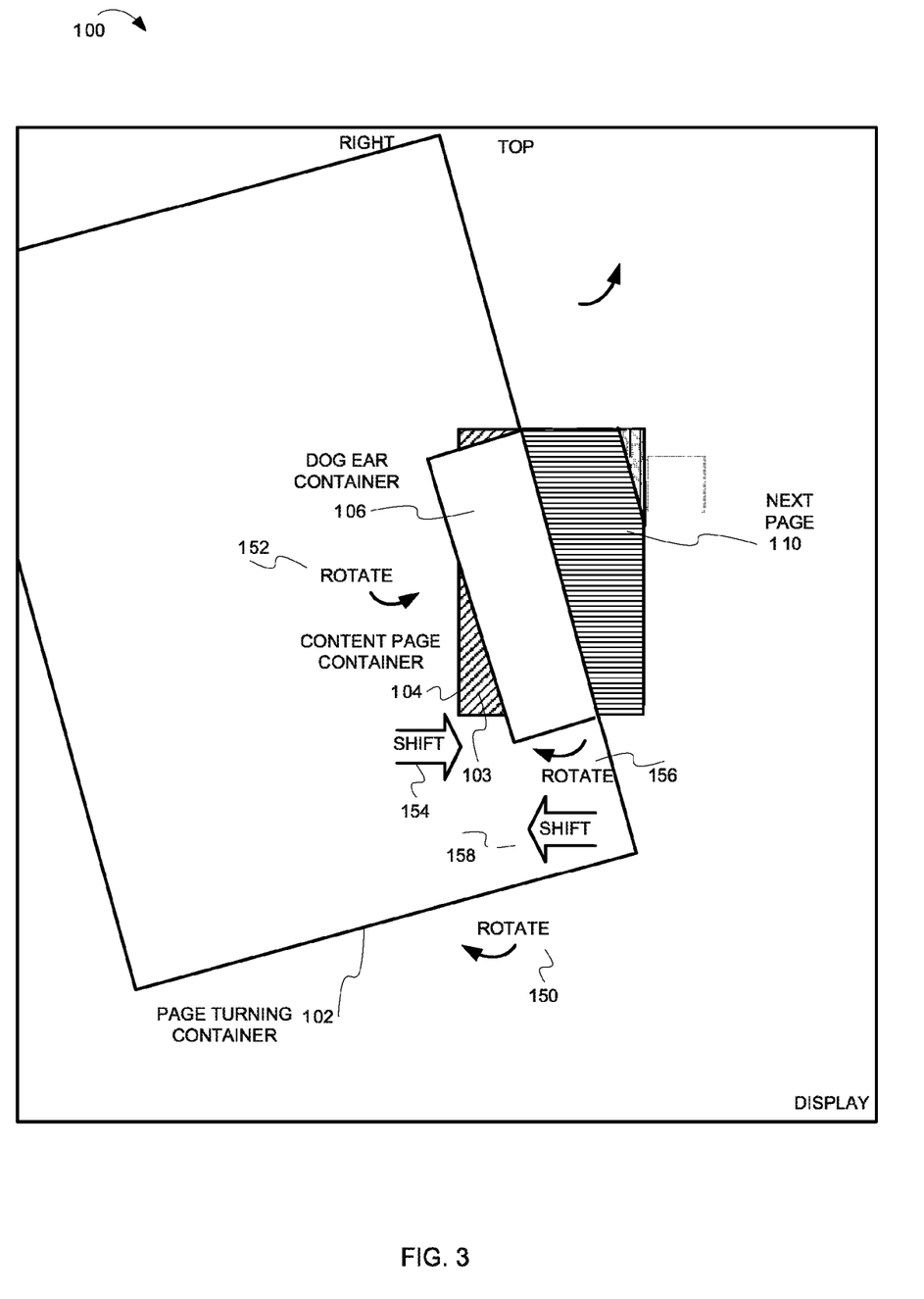
FIG. 3 depicts the display of FIG. 1 that includes dog ear-based electronic page turning at a third point in time, according to some example embodiments.
Figure 4:
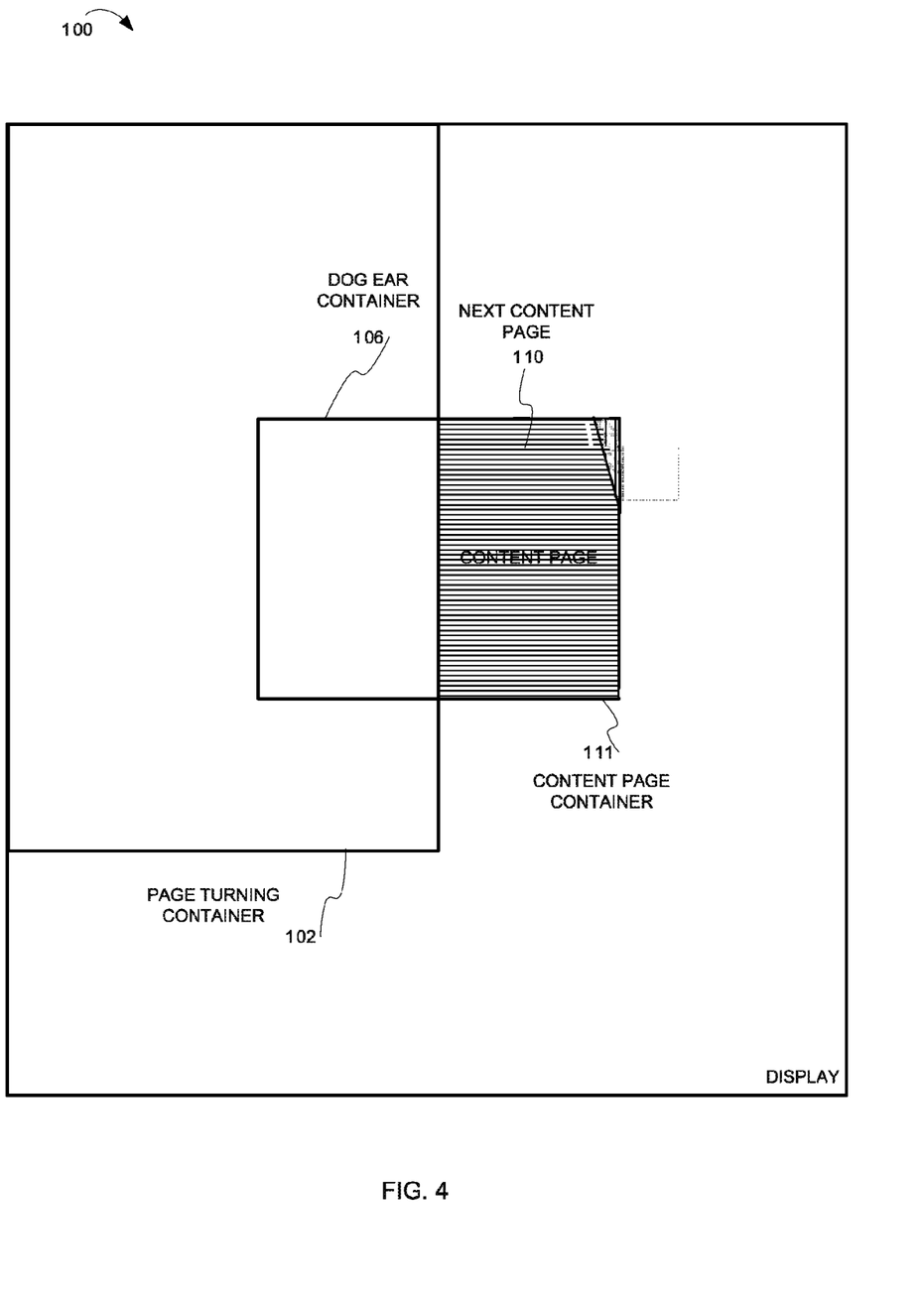
FIG. 4 depicts the display of FIG. 1 that includes dog ear-based electronic page turning at a fourth point in time (after the page turning has completed), according to some example embodiments.

Some example embodiments that use tag-based containers as part of two-dimensional processing for dog ear-based page turning are now described with reference to FIGS. 1-4. In particular, FIGS. 1-4 illustrate (at four different points in time) the tag-based containers (along with their rotation and shifting) to provide for a dog ear-based page turn. FIG. 1 depicts the tag-based containers at a beginning point in time. FIGS. 2-3 depict the tag-based containers at two subsequent points in time. And, FIG. 4 depicts the tag-based containers at a final point in time after the page turn is complete. Also, FIGS. 1-4 depict a group of containers for turning a page. As further described below, multiples of these groups of containers can be stacked to provide for stacking of multiple pages that can be page turned. For example, the pages can be part of a book, magazine, periodical, etc. Additionally, the examples of FIGS. 1-4 illustrate an English-based page turn (progression that is left to right). Some example embodiments are applicable to an Asian-based page turn (progression that is right to left). These different embodiments are further described below in reference to the flowcharts of FIGS. 5-7.

Figure 8:
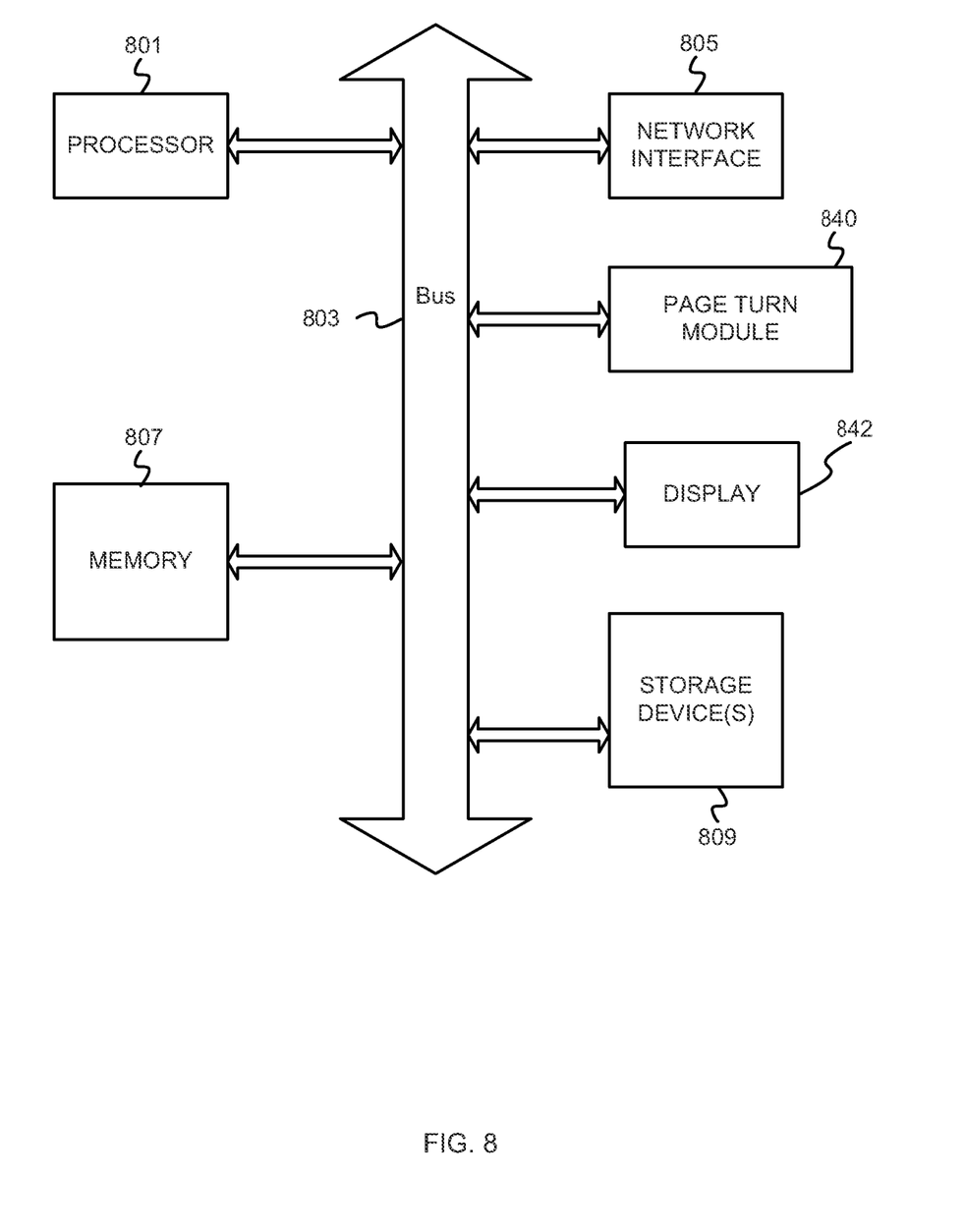
FIG. 8 depicts a computer system, according to some example embodiments.

FIG. 1 depicts a display that includes dog ear-based electronic page turning at a first point in time, according to some example embodiments. In particular, FIG. 1 depicts a display 100 that can represent any type of display for presenting electronic media. For example, the display 100 can be a display for a tablet computer, a smart phone, electronic reader, or any other type of computing device. An example architecture for such a computing device is depicted in FIG. 8 (which is further described below).

FIG. 1 includes three tag-based containers for providing dog-based page turning of a content page 103: 1) a page turning container 102; 2) a content page container 104 (that includes the content page 103); and 3) a dog ear container 106. The tag-based containers can represent any type of division or section of a page or document. In some example embodiments, the tag-based containers are HyperText Markup Language (HTML) divisions or sections of an HTML document.

At its initial position, the page turning container 102 is rotated to a position such that its right top corner is positioned at or near −32 degrees relative to the sides of the display 100. The content page container 104 is contained within the page turning container 102 and is positioned such that the content page is approximately aligned with the display 102. Thus, the content page container 104 is rotated 32 degrees relative to the content page container 104 so that it appears that the content page container has not been rotated relative to the display 100. The dog ear container 106 is positioned at or near −32 degrees relative to the page turning container 102. Therefore, it appears that the dog ear container 106 is rotated −64 degrees relative to the display 100. While described in reference to 32 degrees, in some example embodiments, these positions can vary within a range of degrees (e.g., 25 degrees-45 degrees).

At its initial position, a part of the dog ear container 106 is within the page turning container 102. In particular, a dog ear (i.e., a folded down corner) is within the page turning container 102. The remaining part of the dog ear container 106 is outside the page turning container 102. For the content page and associated dog ear, only the portions that are within the page turning container 102 are displayed. Any parts of the content page container 104 and the dog ear container 106 that are on the display 100 but external to the page turning container 102 are clipped (not viewable on the display 100).

In operation, the page turning container 102 rotates left (150) around the top right corner at the top of the display 100 (away from the dog ear). In operation, the content page container 104 is rotating right (152), and the dog ear container 106 is rotating left (156) so that more of the dog ear covers the content page as the rotation is occurring.

The page turning container 102, the content page container 104, and the dog ear container 106 can rotate at or near a same rate, causing more of the dog ear to cover the content page 103 and revealing more of the next page 110. To illustrate, FIGS. 2 and 3 depict the display of FIG. 1 that includes dog ear-based electronic page turning at a second point in time and a third point in time, according to some example embodiments. As shown, the portions of the content page 103 and the associated dog ear in the dog ear container 106 that are external to page turning container 102 are clipped. Accordingly as rotation continues, more clipping of the content page 103, while less clipping of the dog ear in the dog ear container 106 occurs. Also, as the rotation occurs, a next content page 110 behind the content page 103 is revealed.

FIG. 4 depicts the display of FIG. 1 that includes dog ear-based electronic page turning at a fourth point in time (after the page turning has completed), according to some example embodiments. As shown, the dog ear is completely viewable in the page turning container 102 and the content page 103 has been rotated and shifted external to the page turning container 102. Accordingly, the content page 103 has been clipped from view, thereby revealing the next content page 110 in a different content page container 111 that is within a different page turning container stacked below the page turning container 102.

Accordingly, in contrast to conventional techniques that require scalable vector graphics, some example embodiments use flat, two-dimensional artifacts (the multiple containers) to perform the dog ear-based page turning.

In some example embodiments, the page turning can be a single page-based page turning, wherein the dog ear does not include a content page that is being revealed on what is considered the flip side of the current content page. In some other example embodiments, the page turning can be an open book-based page turning, wherein the dog ear does include a content page that is being revealed on what is considered the flip side of the current content page. Additionally, the dog ear can be transparent or semi-transparent, wherein some or all of the content page being covered by the dog ear is still viewable.

Figure 5:
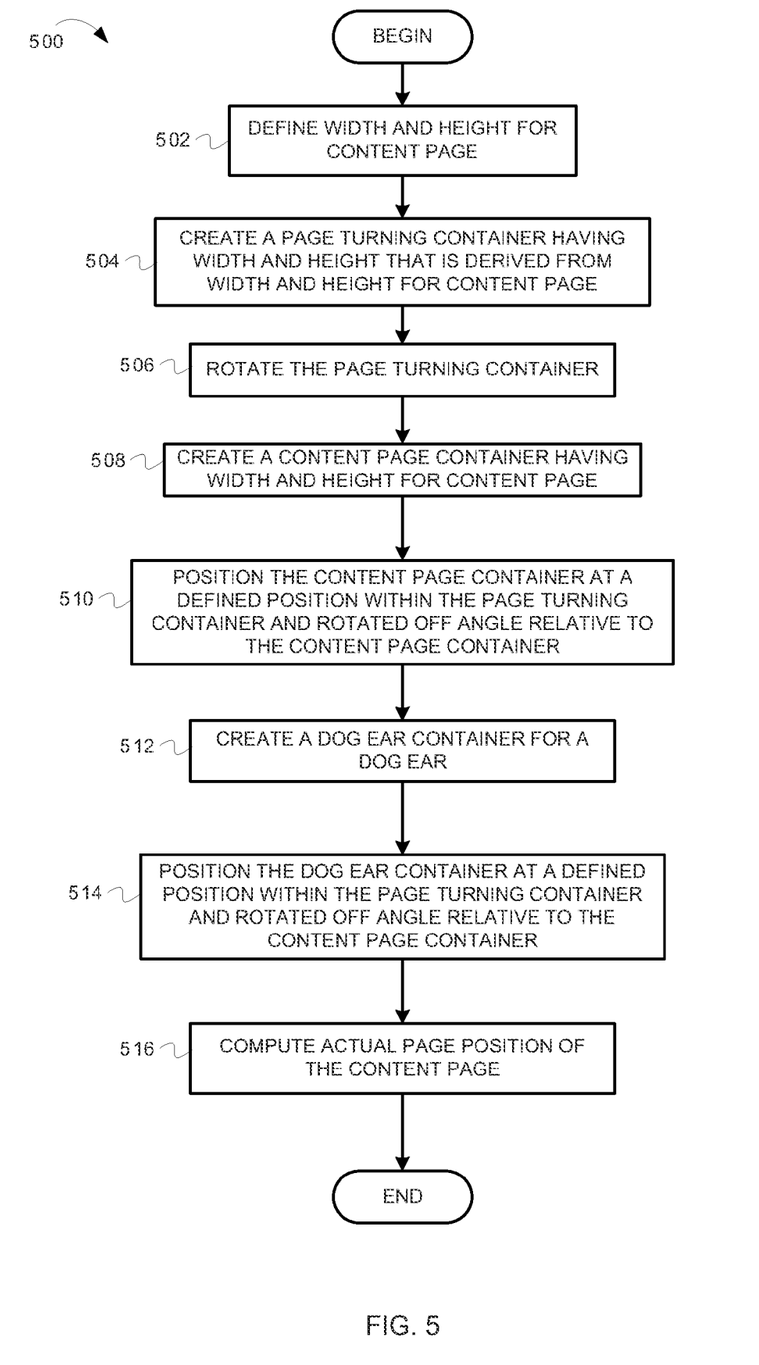
FIG. 5 depicts a flowchart for creation of the content page for an English dog ear-based electronic page turning, according to some example embodiments.
Figure 6:
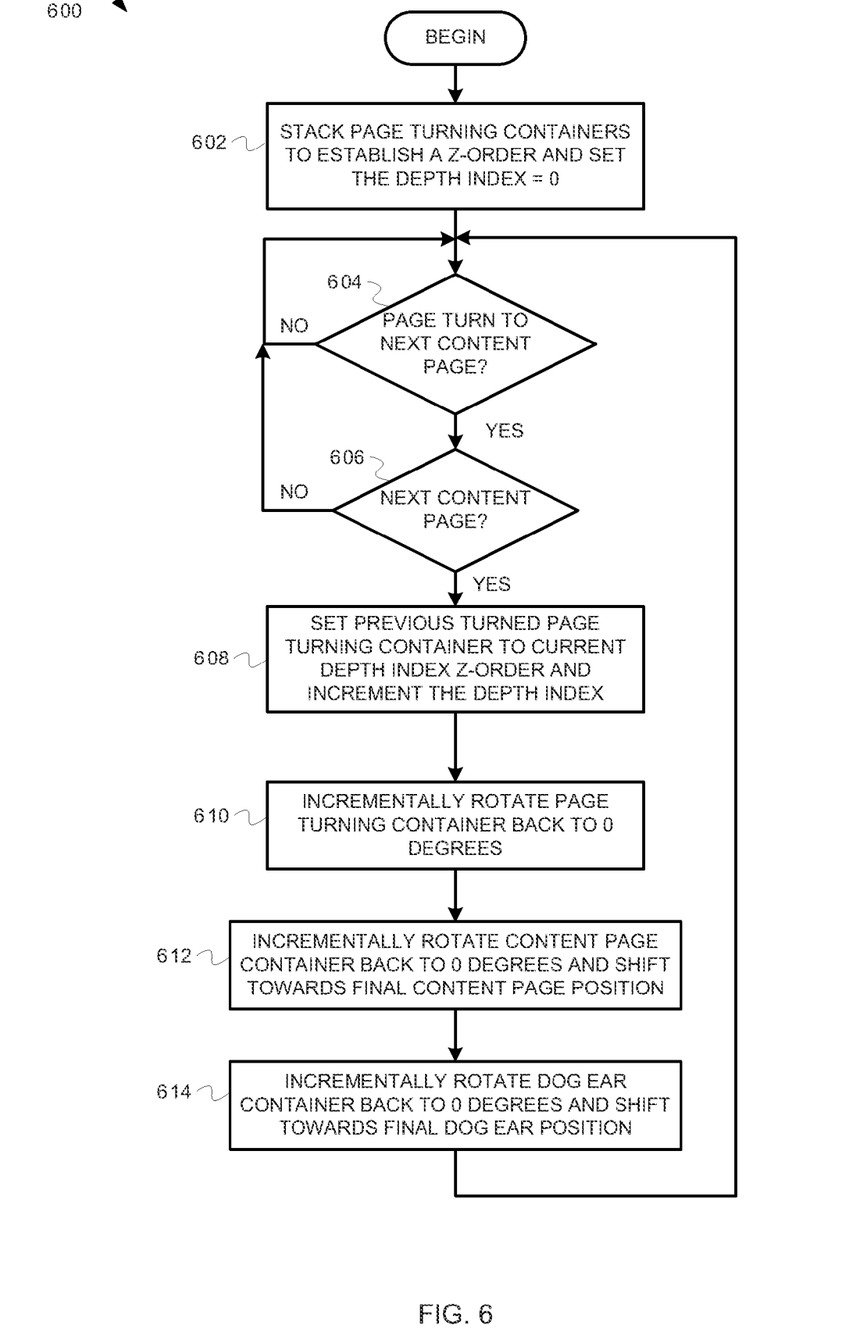
FIG. 6 depicts a flowchart for operations to perform an English dog ear-based electronic page turning to a next page, according to some example embodiments.
Figure 7:
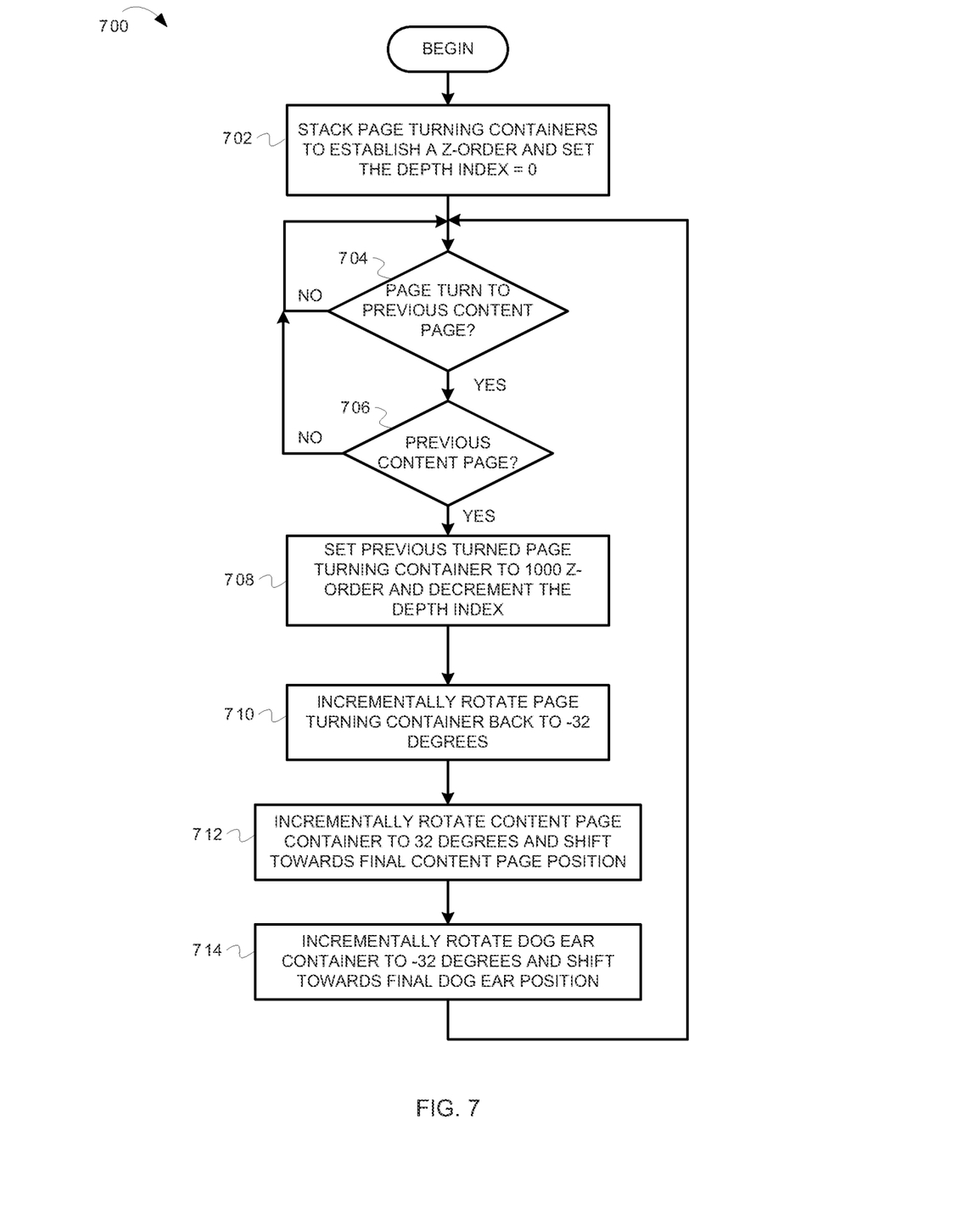
FIG. 7 depicts a flowchart for operations to perform an English dog ear-based electronic page turning to a previous page, according to some example embodiments.

To better illustrate, flowcharts of the operations of page turning are now described. The operations described can be performed by software, firmware, hardware or a combination thereof. For the flowcharts of FIGS. 5-7, the operations are described as being performed by a page turn module and will be described in reference to FIGS. 1-4. An example of the page turn module is depicted in FIG. 8 (which is described in more detail below). FIGS. 5-7 depict three different flowcharts. The operations of the three flowcharts are applicable for both English-based and Asian-based page turning. Accordingly, the flowcharts of FIGS. 5-7 are first described relative to an English-based page turning. The flowcharts of FIGS. 5-7 are then described relative to an Asian-based page turning. The flowchart of FIG. 5 depicts operations for creating of a content page for a dog ear-based electronic page turn. The flowchart of FIG. 6 depicts operations for performing a dog ear-based page turn from a current page to a next page. The flowchart of FIG. 7 depicts operations for performing a dog ear-based page turn from a current page to a previous page.

The flowcharts of FIGS. 5-7 are now described in reference an English-based page turn. FIG. 5 depicts a flowchart for creation of the content page for a dog ear-based electronic page turning, according to some example embodiments. The operations of a flowchart 500 start at block 502.

At block 502, a page turn module defines width and height for the content page. The width and height of the content page can be defined based on the size of the display for the computing device used, configuration settings by the user, etc. With reference to FIGS. 1-4, the page turn module defines the width and the height for the content page 103. Operations of the flowchart 500 continue at block 504.

At block 504, the page turn module creates a page turning container having width and height that is derived from width and height for the content page. With reference to FIGS. 1-4, the page turn module creates the page turning container 102. The width of the page turning container is derived from Equation (1):

$$\text{PageTurnWidth} = R + T \quad (1)$$

wherein R and T are derived from Equations (2)-(5):

$$Q = \text{PageWidth} * \tan 58 \quad (2)$$

$$R = Q * \sin 32 \quad (3)$$

$$S = Q * \cos 32 \quad (4)$$

$$T = S * \tan 58 \quad (5)$$

The height of the page turning container is derived from Equation (6):

$$\text{PageTurnHeight} = \text{PageWidth} * \tan 58 + \text{PageWidth} + \text{PageWidth}/\tan 58 \quad (6)$$

wherein PageWidth is the width of the content page. Operations of the flowchart 500 continue at block 506.

At block 506, the page turn module rotates the page turning container. With reference to FIGS. 1-4, the page turn module rotates the page turning container 102 from its top right corner to the position shown in FIG. 1. In this example, the page turning container 102 is rotated −32 degrees. As described above, the amount of rotation can vary (e.g., 25 degrees-45 degrees). Operations of the flowchart 500 continue at block 508.

At block 508, the page turn module creates a content page container having width and height for content page. With reference to FIGS. 1-4, the page turn module creates the content page container 104 having a width and height that is equal to the width and height of the content page defined at block 502 (described above). Operations of the flowchart 500 continue at block 510.

At block 510, the page turn module positions the content page container at a defined position within the page turning container and rotated off angle relative to the content page container. With reference to FIGS. 1-4, the page turn module positions the content page container 104 within the page turning container 102. In this example, the position of the content page container 104 is defined by a position X (EnglishPagePosX) and a position Y (EnglishPagePosY) based on Equations (7)-(11). In particular, the position of the content page container 104 is based on a size of the dog ear (DogEar), the width of the content page 103 (PageWidth), and the width of the page turning container 102 (PageTurnWidth):

$$\text{DogEar} = \text{PageWidth} * 11\% \quad (7)$$

$$PW = \text{PageWidth} - \text{DogEar} \quad (8)$$

$$\text{Base} = PW * \cos 32 \quad (9)$$

$$\text{EnglishPagePosX} = \text{PageTurnWidth} - \text{Base} \quad (10)$$

$$\text{EnglishPagePosY} = \text{Base} * \tan 58 \quad (11)$$

Additionally in this example, the content page container 104 is rotated 32 degrees from its top left corner, so that it appears as shown in FIG. 1. In particular, the content page container 104 is rotated 32 degrees (in the opposite direction of the initial rotation of the page turning container 102) to offset the rotation of the page turning container 102 so that the content page 103 appears that it is essentially at a same angle as the display 100. Operations of the flowchart 500 continue at block 512.

At block 512, the page turn module creates a dog ear container for a dog ear. With reference to FIGS. 1-4, the page turn module creates the dog ear container 106 for containing the dog ear. As shown, in the initial position in FIG. 1, the dog ear that is displayed because it is within the page turning container 102 is small. As shown, at later points in time in FIGS. 2-4, the dog ear that is displayed increases in size. Operations of the flowchart 500 continue at block 514.

At block 514, the page turn module positions the dog ear container at a defined position within the page turning container and rotated off angle relative to the content page container. With reference to FIGS. 1-4, the page turn module positions the dog ear container 106 partially within the page turning container 102. In this example, the position of the dog ear container 106 is defined by a position X (EnglishDogEarX) and a position Y (EnglishDogEarY) based on Equations (12)-(13). In particular, the position of the dog ear container 106 is based on the width of the page turning container 102 (PageTurnWidth), the size of the dog ear (DogEar), and the position Y of the content page container 104:

$$\text{EnglishDogEarX} = \text{PageTurnWidth} - \text{DogEar} \quad (12)$$

$$\text{EnglishDogEarY} = \text{EnglishPagePosY} + PW/\tan 58 - 7 \quad (13)$$

Additionally in this example, the dog ear container 106 is rotated −32 degrees from its top left corner, so that it appears as shown in FIG. 1. In particular, the dog ear container 106 is rotated 32 degrees (in the direction of the initial rotation of the page turning container 102) so that it appears that the dog ear container 106 has been rotated −64 degrees. Operations of the flowchart 500 continue at block 516.

At block 516, the page turn module computes actual page position of the content page. With reference to FIGS. 1-4, the page turn module determines a final position of the top left corner of the content page 103 within the page turning container 102 after the page turn has been completed. Using this final position along with the initial positions, the page turn module can determine the rotation and shifting of the different containers to allow for the page turning operation (as further described below). In this example, the final position of the page (FinalEnglishPagePosition) is based on Equation (14):

$$\text{FinalEnglishPagePosition} = \text{EnglishPagePosY}/\cos 32 \quad (14)$$

Operations of the flowchart 500 are complete.

Operations for an English-based page turn to a next page are now described with reference to a flowchart FIG. 6. In particular, FIG. 6 depicts a flowchart for operations to perform a dog ear-based electronic page turning to a next page, according to some example embodiments. The operations of a flowchart 600 start at block 602.

At block 602, the page turn module stacks page turning containers to establish a Z-order and set the depth index equal to zero. With reference to FIGS. 1-4, there is one page turning container. Accordingly, any number of these page turning containers can be stacked to allow for the stacking of a number of pages to provide for page turning for the number of pages that have been stacked. Also, the page turning moves in either direction in a Z order. To begin operations, the depth index is set to zero. Operations of the flowchart 600 continue at block 604.

At block 604, the page turn module determines whether an input has been received to turn to the next content page. If there is no input to turn to the next page, operations of the flowchart 600 wait until such input is received (staying at block 604). Otherwise, if such an input is received, operations of the flowchart 600 continue at block 606.

At block 606, the page turn module determines whether there is a next content page. For example, the current content page may be the last page of an electronic book. Accordingly, there is no next content page after the current content page. If there is no next content page, operations of the flowchart 600 return to block 604 and waits until a next content page is requested such that a next content page is available. Otherwise, if there is a next content page, operations of the flowchart 600 continue at block 608.

At block 608, the page turn module sets previous turned page turning container to current depth index z-order and increment the depth index. The page turn module is then able to track the depth index values for the content pages. Operations of the flowchart 600 continue at block 610.

The operations at blocks 610-614 (which are now described) cause the rotation and shifting of the containers so the content page is turned to a next content page. The operations at block 610-614 can be performed at or near the same time. Additionally, the rotating and shifting of the containers can be at or near the same rate.

At block 610, the page turn module incrementally rotates the page turning container back to 0 degrees. With reference to FIGS. 1-4, the page turn module begins rotation of the page turning container 102 clockwise (see rotate 150) back to the 0 degree position. The rotation back to the 0 degree position of the page turning container 102 can be seen in FIGS. 2-3. Additionally, the page turning container 102 at the 0 degree position can be seen in FIG. 4. Operations of the flowchart 600 continue at block 612.

At block 612, the page turn module incrementally rotates the content page container back to 0 degrees and shift towards final content page position. With reference to FIGS. 1-4, the page turn module rotates (152) counterclockwise and shifts (154) to the right the content page container 104 toward the final content page position within the page turning container 102 that is defined by Equation (14) (described above). The final position of the content page is FinalEngishActualPagePosition for position Y and PageTurnWidth for position X. The rotation and shifting of the content page container 104 can be seen in FIGS. 2-3 and is performed to offset the rotation of the page turning container 102, so that the content page 103 appears to remain essentially at a same angle as the display 100 while the page turning is occurring. Additionally, the content page container 104 at its final position can be seen in FIG. 4. Operations of the flowchart 600 continue at block 614.

At block 614, the page turn module incrementally rotates the dog ear container back to 0 degrees and shift towards final dog ear position. With reference to FIGS. 1-4, the page turn module rotates (156) clockwise and shifts (158) to the left the dog ear container 106 so that the dog ear progressively covers the content page 103. The final position of the dog ear is the FinalEngishActualPagePosition for position Y and (PageTurnWidth−PageWidth) for position X. The rotation and shifting of the dog ear container 106 can be seen in FIGS. 2-3. Additionally, the dog ear container 106 at its final position can be seen in FIG. 4. Operations of the flowchart 600 return to block 604 to wait for a next input from the user.

Operations for an English-based page turn to a previous page are now described with reference to a flowchart FIG. 7. In particular, FIG. 7 depicts a flowchart for operations to perform a dog ear-based electronic page turning to a previous page, according to some example embodiments. The operations of a flowchart 700 start at block 702.

At block 702, the page turn module stacks page turning containers to establish a Z-order and set the depth index equal to zero. With reference to FIGS. 1-4, there is one page turning container. Accordingly, any number of these page turning containers can be stacked to allow for the stacking of a number of pages to provide for page turning for the number of pages that have been stacked. Also, the page turning moves in either direction in a Z order. To begin operations, the depth index is set to zero. Operations of the flowchart 700 continue at block 704.

At block 704, the page turn module determines whether an input has been received to turn to the previous content page. If there is no input to turn to the previous page, operations of the flowchart 700 wait until such input is received (staying at block 704). Otherwise, if such an input is received, operations of the flowchart 700 continue at block 706.

At block 706, the page turn module determines whether there is a previous content page. For example, the current content page may be the first page of an electronic book. Accordingly, there is no previous content page before the current content page. If there is no previous content page, operations of the flowchart 700 return to block 704 and waits until a previous content page is requested such that a previous content page is available. Otherwise, if there is a previous content page, operations of the flowchart 700 continue at block 708.

At block 708, the page turn module sets previous turned page turning container to current depth index to 1000 z-order and decrement the depth index. A z-order of 1000 can be appropriate for a 1000 pages that are stacked together. This value can vary based on the number of page containers (as long as this value is higher than the number of page containers). The page turn module is then able to track the depth index values for the content pages. Operations of the flowchart 700 continue at block 710.

The operations at blocks 710-714 (which are now described) cause the rotation and shifting of the containers so the content page is turned to a previous content page. The operations at block 710-714 can be performed at or near the same time. Additionally, the rotating and shifting of the containers can be at or near the same rate.

At block 710, the page turn module incrementally rotates the page turning container back to −32 degrees. With reference to FIG. 4, the page turn module begins rotation of the page turning container 102 counterclockwise (opposite of rotate 150) back to the −32 degree position in FIG. 1. The rotation back to the −32 degree position of the page turning container 102 can be seen in FIGS. 2-3. Additionally, the page turning container 102 at the −32 degree position can be seen in FIG. 1. Operations of the flowchart 700 continue at block 712.

At block 712, the page turn module incrementally rotates the content page container back to 32 degrees and shift towards final content page position. With reference to FIGS. 1-4, the page turn module rotates clockwise (opposite of rotate 152) and shifts to the left (opposite of the shift 154) the content page container 104 toward the final content page position within the page turning container 102. The rotation and shifting of the content page container 104 can be seen in FIGS. 2-3 and is performed to offset the rotation of the page turning container 102, so that the content page 103 appears to remain essentially at a same angle as the display 100 while the page turning is occurring. Additionally, the content page container 104 begins at the position shown in FIG. 4 and ends at its final position shown in FIG. 1. Operations of the flowchart 700 continue at block 714.

At block 714, the page turn module incrementally rotates the dog ear container back to −32 degrees and shift towards final dog ear position. With reference to FIGS. 1-4, the page turn module rotates counterclockwise (opposite of rotate 156) and shifts to the right (opposite of the shift 158) the dog ear container 106 so that the dog ear progressively uncovers the content page 103. The rotation and shifting of the dog ear container 106 can be seen in FIGS. 2-3. Additionally, the dog ear container 106 begins at the position shown in FIG. 4 and ends at its final position shown in FIG. 1. Operations of the flowchart 700 return to block 704 to wait for a next input from the user.

The flowcharts of FIGS. 5-7 are now described in reference an Asian-based page turn. The operations of a flowchart 500 start at block 502.

At block 502, a page turn module defines width and height for the content page. The width and height of the content page can be defined based on the size of the display for the computing device used, configuration settings by the user, etc. The page turn module defines the width and the height for the content page. Operations of the flowchart 500 continue at block 504.

At block 504, the page turn module creates a page turning container having width and height that is derived from width and height for the content page. The page turn module creates the page turning container. The width of the page turning container is derived from Equation (15):

$$PageTurnWidth = R + T \quad (15)$$

wherein R and T are derived from Equations (16)-(19):

$$Q = PageWidth * \tan 58 \quad (16)$$

$$R = Q * \sin 32 \quad (17)$$

$$S = Q * \cos 32 \quad (18)$$

$$T = S * \tan 58 \quad (19)$$

The height of the page turning container is derived from Equation (20):

$$PageTurnHeight = PageWidth * \tan 58 + PageWidth + PageWidth/\tan 58 \quad (20)$$

wherein PageWidth is the width of the content page. Operations of the flowchart 500 continue at block 506.

At block 506, the page turn module rotates the page turning container. The page turn module rotates the page turning container 102 from its top left corner. In this example, the page turning container 102 is rotated 32 degrees. As described above, the amount of rotation can vary (e.g., 25 degrees-45 degrees). Operations of the flowchart 500 continue at block 508.

At block 508, the page turn module creates a content page container having width and height for content page. The page turn module creates the content page container 104 having a width and height that is equal to the width and height of the content page defined at block 502 (described above). Operations of the flowchart 500 continue at block 510.

At block 510, the page turn module positions the content page container at a defined position within the page turning container and rotated off angle relative to the content page container. In this example, the position of the content page container is defined by a position X (AsianPagePosX) and a position Y (AsianPagePosY) based on Equations (21)-(23). In particular, the position of the content page container is based on a size of the dog ear (DogEar) and the width of the content page (PageWidth):

$$DogEar = PageWidth * 11\% \quad (21)$$

$$AsianPagePosX = -DogEar \quad (22)$$

$$AsianPagePosY = (PageWidth - DogEar)/\sin 32 = DogEar * \sin 32 \quad (23)$$

Additionally in this example, the content page container 104 is rotated 32 degrees from its top left corner −32 degrees (in the opposite direction of the initial rotation of the page turning container) to offset the rotation of the page turning container so that the content page appears that it is essentially at a same angle as the display 100. Operations of the flowchart 500 continue at block 512.

At block 512, the page turn module creates a dog ear container for a dog ear. The page turn module creates the dog ear container for containing the dog ear. Similar to the English-based page turn, in the initial position, the dog ear that is displayed because it is within the page turning container is small. Similar to the English-based page turn, at later points in time, the dog ear that is displayed increases in size. Operations of the flowchart 500 continue at block 514.

At block 514, the page turn module positions the dog ear container at a defined position within the page turning container and rotated off angle relative to the content page container. Similar to the English-based page turn, the page turn module positions the dog ear container partially within the page turning container. In this example, the position of the dog ear container is defined by a position X (AsianDogEarX) and a position Y (AsianDogEarY) based on Equations (24)-(25). In particular, the position of the dog ear container is based on the width of the content page (PageWidth), the size of the dog ear (DogEar), and the position Y of the content page container (AsianPagePosY):

$$AsianDogEarX = DogEar - PageWidth \quad (24)$$

$$AsianDogEarY = AsianPagePosY \quad (25)$$

Additionally in this example, the dog ear container 106 is rotated 32 degrees from its top left corner. In particular, the dog ear container is rotated 32 degrees (in the direction of the initial rotation of the page turning container) so that it appears that the dog ear container has been rotated 64 degrees. Operations of the flowchart 500 continue at block 516.

At block 516, the page turn module computes actual page position of the content page. The page turn module determines a final position of the top left corner of the content page within the page turning container after the page turn has been completed. Using this final position along with the initial positions, the page turn module can determine the rotation and shifting of the different containers to allow for the page turning operation (as further described below). In this example, the final position of the page is defined by a position X (FinalAsianPagePositionX) and a position Y (FinalAsianPagePositionY) is based on Equation (26)-(27):

FinalAsianPagePositionX=(PageWidth−DogEar)/tan 32−2     (26)

FinalAsianPagePositionY=−PageWidth−3     (27)

Operations of the flowchart 500 are complete.

Operations for an Asian-based page turn to a next page are now described with reference to a flowchart FIG. 6. In particular, FIG. 6 depicts a flowchart for operations to perform a dog ear-based electronic page turning to a next page, according to some example embodiments. The operations of a flowchart 600 start at block 602.

At block 602, the page turn module stacks page turning containers to establish a Z-order and set the depth index equal to zero. With reference to FIGS. 1-4, there is one page turning container. Accordingly, any number of these page turning containers can be stacked to allow for the stacking of a number of pages to provide for page turning for the number of pages that have been stacked. Also, the page turning moves in either direction in a Z order. To begin operations, the depth index is set to zero. Operations of the flowchart 600 continue at block 604.

At block 604, the page turn module determines whether an input has been received to turn to the next content page. If there is no input to turn to the next page, operations of the flowchart 600 wait until such input is received (staying at block 604). Otherwise, if such an input is received, operations of the flowchart 600 continue at block 606.

At block 606, the page turn module determines whether there is a next content page. For example, the current content page may be the last page of an electronic book. Accordingly, there is no next content page after the current content page. If there is no next content page, operations of the flowchart 600 return to block 604 and waits until a next content page is requested such that a next content page is available. Otherwise, if there is a next content page, operations of the flowchart 600 continue at block 608.

At block 608, the page turn module sets previous turned page turning container to current depth index z-order and increment the depth index. The page turn module is then able to track the depth index values for the content pages. Operations of the flowchart 600 continue at block 610.

The operations at blocks 610-614 (which are now described) cause the rotation and shifting of the containers so the content page is turned to a next content page. The operations at block 610-614 can be performed at or near the same time. Additionally, the rotating and shifting of the containers can be at or near the same rate.

At block 610, the page turn module incrementally rotates the page turning container back to 0 degrees. The page turn module begins rotation of the page turning container 102 counterclockwise back to the 0 degree position. Operations of the flowchart 600 continue at block 612.

At block 612, the page turn module incrementally rotates the content page container back to 0 degrees and shift towards final content page position (FinalAsianPagePositionX and FinalAsianPagePositionY). The page turn module rotates clockwise and shifts to the left the content page container toward the final content page position within the page turning container. The rotation and shifting of the content page container is performed to offset the rotation of the page turning container, so that the content page appears to remain essentially at a same angle as the display 100 while the page turning is occurring. Operations of the flowchart 600 continue at block 614.

At block 614, the page turn module incrementally rotates the dog ear container back to 0 degrees and shift towards final dog ear position. The page turn module rotates counterclockwise and shifts to the right the dog ear container so that the dog ear progressively covers the content page. The final position of the dog ear is zero for position X and AsianPagePosY for position Y. Operations of the flowchart 600 return to block 604 to wait for a next input from the user.

Operations for an Asian-based page turn to a previous page are now described with reference to a flowchart FIG. 7. In particular, FIG. 7 depicts a flowchart for operations to perform a dog ear-based electronic page turning to a previous page, according to some example embodiments. The operations of a flowchart 700 start at block 702.

At block 702, the page turn module stacks page turning containers to establish a Z-order and set the depth index equal to zero. With reference to FIGS. 1-4, there is one page turning container. Accordingly, any number of these page turning containers can be stacked to allow for the stacking of a number of pages to provide for page turning for the number of pages that have been stacked. Also, the page turning moves in either direction in a Z order. To begin operations, the depth index is set to zero. Operations of the flowchart 700 continue at block 704.

At block 704, the page turn module determines whether an input has been received to turn to the previous content page. If there is no input to turn to the previous page, operations of the flowchart 700 wait until such input is received (staying at block 704). Otherwise, if such an input is received, operations of the flowchart 700 continue at block 706.

At block 706, the page turn module determines whether there is a previous content page. For example, the current content page may be the first page of an electronic book. Accordingly, there is no previous content page before the current content page. If there is no previous content page, operations of the flowchart 700 return to block 704 and waits until a previous content page is requested such that a previous content page is available. Otherwise, if there is a previous content page, operations of the flowchart 700 continue at block 708.

At block 708, the page turn module sets previous turned page turning container to current depth index to 1000 z-order and decrement the depth index. A z-order of 1000 can be appropriate for a 1000 pages that are stacked together. This value can vary based on the number of page containers (as long as this value is higher than the number of page containers). The page turn module is then able to track the depth index values for the content pages. Operations of the flowchart 700 continue at block 710.

The operations at blocks 710-714 (which are now described) cause the rotation and shifting of the containers so the content page is turned to a previous content page. The operations at block 710-714 can be performed at or near the same time. Additionally, the rotating and shifting of the containers can be at or near the same rate.

At block 710, the page turn module incrementally rotates the page turning container back to 32 degrees. The page turn module begins rotation from the top left corner of the page turning container counterclockwise back to the −32 degree position. Operations of the flowchart 700 continue at block 712.

At block 712, the page turn module incrementally rotates the content page container back to −32 degrees and shift towards final content page position (FinalAsianPagePositionX and FinalAsianPagePositionY). The page turn module rotates counterclockwise and shifts to the right the content page container toward the final content page position within the page turning container. The rotation and shifting of the content page container is performed to offset the rotation of the page turning container, on that the content page appears to remain essentially at a same angle as the display 100 while the page turning is occurring. Operations of the flowchart 700 continue at block 714.

At block 714, the page turn module incrementally rotates the dog ear container back to 32 degrees and shift towards final dog ear position. The page turn module rotates clockwise and shifts to the left the dog ear container so that the dog ear progressively covers the content page. The final position of the dog ear is AsianDogEarX for position X and AsianDogEarY for position Y. Operations of the flowchart 700 return to block 704 to wait for a next input from the user.

In some example embodiments, a sinusoidal dampening is performed. The dampening is based on the degree that the content page container is rotated (which is done incrementally). In some example embodiments, a delta is added to a current frame position of the content page container to dampen the sinusoidal effect. Example adjustments are defined in Equations (28)-(31)

$$\text{Delta}=5.625*\sin(6*Pi/180) \quad (28)$$

$$\text{AdjustY}=\text{Delta}*3.2 \quad (29)$$

$$x\mathrel{+}=\text{Delta} \quad (30)$$

$$y\mathrel{-}=\text{AdjustY} \quad (31)$$

These deltas for x and y positions for the content page container defined by Equations (30) and (31), respectively, can be appropriate for 32 degree usage (as described above). However, these deltas for x and y positions for the content page container can vary based on the angles used. For example, for 45 degree usage, different delta can be used.

Example HTML tag language is set forth below to produce five viewable pages:

<div class=catalog >
  <div id=3 class="front" style="z-index:10;overflow: visible;">
    <div class=content><img src=page5.png></div>
  </div>
  <div id=2 class="front" style="z-index: 10;overflow: visible;">
    <div class=content style="background-image: url (page3.png);">
  </div>
    <div class=dogear><img src=page4.png></div>
  </div>
  <div id=1 class="front" style="z-index:10;">
    <div class=content style="background-image: url (page1.png);"></div>
    <div class=dogear><img src=page2.png></div>
  </div>
</div>

In this example, there are three Front DIVs as stated as the basis for display pages (a display page contains a content and a dogear). Therefore, there are three layers. As each layer or Front DIV is rotated, the underneath layer is shown having the effect of a turning page (as described above).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 8 depicts a computer system, according to some example embodiments. A computer system includes a processor 801 (possibly including multiple processors, multiple cores, multiple nodes, and/or implementing multi-threading, etc.). The computer system includes a memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) YY09 (e.g., optical storage, magnetic storage, etc.). The computer system includes a display 842, which can be representative of the display 100 of FIGS. 1-4, to display the page turning as described herein. The computer system also includes a page turn module 840 to perform the page turning as described herein. Some or all of the operations of the page turn module 840 may be implemented with code embodied in the memory and/or processor, co-processors, other cards, etc. Any one of these operations may be partially (or entirely) implemented in hardware and/or on the processor 801. For example, the operations may be implemented with an application specific integrated circuit, in logic implemented in the processor 801, in a co-processor on a peripheral device or card, etc.

Further, realizations may include fewer or additional components not illustrated in FIG. 8 (e.g., video cards, audio cards, additional network interfaces, peripheral devices, etc.). The processor 801, the storage device(s) 809, the network interface 805, the memory 807, the page turn module 840, and the display 842 are coupled to the bus 803. Although illustrated as being coupled to the bus 803, the memory 807 may be coupled to the processor 801.

While the embodiments are described with reference to various implementations and exploitations, it will be understood that these embodiments are illustrative and that the scope of the inventive subject matter is not limited to them. In general, techniques for page turning as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
presenting, by a processor, a content page of a number of content pages on a display of an electronic device, wherein the presenting of the content page comprises,
placing the content page in a content page container;
determining a length and a width of the content page;
determining a length and a width of a page turning container that is derived from the length and the width of the content page;
creating the page turning container based on the length and the width derived from the length and the width of the content page;
positioning the page turning container to an off-angle relative to a display of an electronic device;
placing the content page container within the page turning container such that the content container is approximately at a same angle as the display of the electronic device;
determining an initial size of a dog ear;
determining a position of the dog ear to covering a top corner of the content page;
creating a dog ear container;
positioning the dog ear container on the display based on the position of the dog ear and such that the initial size of the dog ear covers the top corner of the content page is within the page turning container;
receiving an input for electronically page turning from the content page to a different content page of the number of content pages; and
in response to the input for electronically page turning, performing page turning operations comprising,
rotating the page turning container around a top point of the page turning container relative to the display and toward the dog ear container, until a final position is reached for the content page and the dog ear; and
clipping from being displayed on the display a portion of the content page and the dog ear that are not within the page turning container.

2. The method of claim 1, wherein the page turning operations comprise,
rotating the content page container in a direction that is opposite of a direction of the rotating of the page turning container; and
shifting the content page container in the direction of the dog ear.

3. The method of claim 2, wherein the page turning operations comprise,
rotating the dog ear container in a direction that is opposite of a direction of the rotating of the page turning container; and
shifting the dog ear container in the direction of the content page.

4. The method of claim 1, wherein the page turning operations are independent of a distortion of the content page.

5. The method of claim 1, wherein the content page is dynamically loaded.

6. The method of claim 1, wherein the page turning container is within a number of page turning containers, wherein each of the number of content pages is within one of the number of content page containers, wherein the method comprises:
stacking the number of page turning containers to create a book of content pages.

7. The method of claim 1, wherein the page turning container, the content page container and the dog ear container comprise HyperText Markup Language divisions.

8. A computer program product for page turning, the computer program product comprising:
a non-transitory computer readable storage medium having computer usable program code embodied therewith, the computer usable program code comprising a computer usable program code configured to:
present a content page of a number of content pages on a display of an electronic device, wherein the present of the content page comprises,
place the content page in a content page container;
determine a length and a width of the content page;
determine a length and a width of a page turning container that is derived from the length and the width of the content page;
create the page turning container based on the length and the width derived from the length and the width of the content page;
position the page turning container to an off-angle relative to a display of an electronic device;
place the content page container within the page turning container such that the content container is approximately at a same angle as the display of the electronic device;
determine an initial size of a dog ear;
determine a position of the dog ear to covering a top corner of the content page;
create a dog ear container;
position the dog ear container on the display based on the position of the dog ear and such that the initial size of the dog ear covers the top corner of the content page is within the page turning container;
receive an input for electronically page turning from the content page to a different content page of the number of content pages; and
in response to the input for electronically page turning, perform page turning operations comprising,
rotate the page turning container around a top point of the page turning container relative to the display and toward the dog ear container, until a final position is reached for the content page and the dog ear; and
clip from being displayed on the display a portion of the content page and the dog ear that are not within the page turning container.

9. The computer program product of claim 8, wherein the page turning operations comprise,
rotate the content page container in a direction that is opposite of a direction of the rotating of the page turning container; and
shift the content page container in the direction of the dog ear.

10. The computer program product of claim 9, wherein the page turning operations comprise,
rotate the dog ear container in a direction that is opposite of a direction of the rotating of the page turning container; and
shift the dog ear container in the direction of the content page.

11. The computer program product of claim 8, wherein the page turning operations are independent of a distortion of the content page.

12. The computer program product of claim 8, wherein the content page is dynamically loaded.

13. The computer program product of claim 8, wherein the page turning container is within a number of page turning containers, wherein each of the number of content pages is within one of the number of content page containers, wherein the computer usable program code is configured to:
stack the number of page turning containers to create a book of content pages.

14. The computer program product of claim 8, wherein the page turning container, the content page container and the dog ear container comprise HyperText Markup Language divisions.

15. An apparatus comprising:
a display;
a processor communicatively coupled to the display;
a page turn module executable on the processor, the page turn module configured to,
present a content page of a number of content pages on a display of an electronic device, wherein the present of the content page comprises,
place the content page in a content page container;
determine a length and a width of the content page;
determine a length and a width of a page turning container that is derived from the length and the width of the content page;
create the page turning container based on the length and the width derived from the length and the width of the content page;
position the page turning container to an off-angle relative to a display of an electronic device;
place the content page container within the page turning container such that the content container is approximately at a same angle as the display of the electronic device;
determine an initial size of a dog ear;
determine a position of the dog ear to covering a top corner of the content page;
create a dog ear container;
position the dog ear container on the display based on the position of the dog ear and such that the initial size of the dog ear covers the top corner of the content page is within the page turning container;
receive an input for electronically page turning from the content page to a different content page of the number of content pages; and
in response to the input for electronically page turning, perform page turning operations comprising,
rotate the page turning container around a top point of the page turning container relative to the display and toward the dog ear container, until a final position is reached for the content page and the dog ear; and clip from being displayed on the display a portion of the content page and the dog ear that are not within the page turning container.

16. The apparatus of claim 15, wherein the page turning operations comprise, rotate the content page container in a direction that is opposite of a direction of the rotating of the page turning container; and shift the content page container in the direction of the dog ear.

17. The apparatus of claim 16, wherein the page turning operations comprise, rotate the dog ear container in a direction that is opposite of a direction of the rotating of the page turning container; and shift the dog ear container in the direction of the content page.

18. The apparatus of claim 15, wherein the page turning operations are independent of a distortion of the content page.

19. The apparatus of claim 15, wherein the content page is dynamically loaded.

20. The apparatus of claim 15, wherein the page turning container is within a number of page turning containers, wherein each of the number of content pages is within one of the number of content page containers, wherein the page turn module is configured to:

stack the number of page turning containers to create a book of content pages.

\* \* \* \* \*